United States Patent [19]
Chen et al.

[11] Patent Number: 5,849,045
[45] Date of Patent: Dec. 15, 1998

[54] METHOD FOR PREPARING AND USING ELECTROCONDUCTIVE POLYMER COMPOSITES AS POSITIVE ELECTRODE ACTIVE MATERIALS TO PREPARE SECONDARY BATTERIES

[75] Inventors: Show-An Chen; Liang-Chang Lin, both of Hsinchu, Taiwan

[73] Assignee: National Science Council, Taipei, Taiwan

[21] Appl. No.: 825,290

[22] Filed: Mar. 27, 1997

Related U.S. Application Data

[62] Division of Ser. No. 410,434, Mar. 23, 1995, Pat. No. 5,667,913.

[51] Int. Cl.⁶ .............................. H01M 6/00; B05D 5/12; B05D 7/00
[52] U.S. Cl. ................ 29/623.5; 204/192.1; 252/62.2; 252/511; 427/58; 427/250; 427/388.2; 427/388.5; 427/404; 427/409; 429/215
[58] Field of Search .............................. 427/58, 250, 404, 427/409, 388.2, 388.5; 429/212; 524/104; 252/510–511, 62.2; 204/192.1; 29/623.5

[56] References Cited

U.S. PATENT DOCUMENTS

| | | | |
|---|---|---|---|
| 5,066,556 | 11/1991 | Toyosawa et al. | 429/194 |
| 5,424,151 | 6/1995 | Koksbang et al. | 429/192 X |
| 5,597,661 | 1/1997 | Takeuchi et al. | 252/62.2 X |

*Primary Examiner*—Donald R. Valentine
*Attorney, Agent, or Firm*—W. Wayne Liauh

[57] ABSTRACT

An electroconductive polymer composite for use in secondary batteries as positive electrode active materials is disclosed. It includes 10–99 weight percent of a conjugated electroconductive polymer, such as polyaniline, and 90–1 weight percent of polymeric electrolyte. The latter is composed of 10–90 weight percent of an ionic salt, such as $LiClO_4$, and 90–10 weight percent of a polymer which can form an electrolyte material with the ionic salt. The polymer, for example, can be polyvinyl alcohol or polyalkylene oxide. A method of using the electroconductive polymer composite to prepare the positive electrode of secondary batteries is also disclosed. It includes the steps of dissolving the above three components in an appropriate solvent (such as 1-methyl-2-pyrrolidinone), casting the resulting solution on an appropriate metallic grid or plate (such as nickel, aluminum or platinum) and removing the solvent therein to form a film which adheres to the metal grid or plate, in which the film is a positive electrode active material and the metallic grid or plate is a current collector. This invention also discloses a non-aqueous secondary battery which uses such positive electrode.

20 Claims, 8 Drawing Sheets

METHOD FOR PREPARING AND USING ELECTROCONDUCTIVE POLYMER COMPOSITES AS POSITIVE ELECTRODE ACTIVE MATERIALS TO PREPARE SECONDARY BATTERIES

This is a divisional application of application Ser. No. 08/410,434, filed Mar. 23, 1995, now U.S. Pat. No. 5,667,913.

FIELD OF THE INVENTION

The present invention relates to a non-aqueous secondary battery, particularly a non-aqueous secondary battery which comprises electroconductive polymer composites used as positive electrode active materials.

BACKGROUND OF THE INVENTION

On applications for organic secondary batteries, in 1967 M. Jozefowicz et al. (French Pat. N.P. 95630) innovated in using polyaniline (PAn) as the battery electrode and expanded the development of the organic battery. In 1981, A. G. MacDiarmid et al. (J. Chem. Soc. Chem. Commun., (1981) 317) successfully used electrochemically doped polyacetylene (PA) as the electrode of an organic secondary battery. And E. M. Genies et al. (Mol. Cryst. Liq. Cryst., 121 (1985) 181; Mol. Cryst. Liq. Cryst., 121 (1985) 195) used p-type doped polyaniline as the positive electrode and lithium as the negative electrode to form an organic secondary battery with high energy density and cycle life. Goto et al. (J. Power Sources, 20 (1987) 243) found that among the secondary batteries with PAn, PA, polypyrroles (PPy), polythiophene (PT), etc. as electrodes, the one with PAn has the best performance. It has the advantages of high energy density, power density, capacity efficiency, long cycle life and low self-discharge.

So far, organic secondary batteries, which use polyaniline as the battery plate, can be classified into three major categories. The first group are secondary batteries containing aqueous electrolyte [A. G. MacDiarmid et al., Mol. Cryst. Liq. Cryst., 121 (1985) 187; A. Kitani, M. Kaya, and S. Sasaki, J. Electrochem. Soc., 133 (1986) 1069; N. L. D. Somasiri et al., J. Applied Electrochemistry, 18 (1988) 92; A. G. MacDiarmid et al., U.S. Pat. No. 5,023,149 (1991); F. Trinidad et al., J. Electrochem. Soc., 138 (1991) 3186]. The second group are organic secondary batteries containing non-aqueous electrolyte [A. Kitani et al., Bull. Chem. Soc. Japan, 57 (1984) 2254; E. M. Genies et al., Synthetic Metals, 18 (1987) 631; F. Goto et al., Synthetic Metals, 18 (1987) 365; Ricoh Co. U.S. Pat. No. 5,037,713 (1991)]. The third group are organic secondary batteries containing solid polymeric electrolyte [Hydro-Quebec, U.S. Pat. No. 4,758,483; C. Arrbizzani et al., Synth. Met., 28 (1989) C663; Li Changzhi et al., J. Power Sources, 39 (1992) 255; T. Ohsawa et al. (Ricoh Corp.) Synthetic Metals, 41 (1991) 3021]. In non-aqueous media, usually lithium was used as the negative electrode because of its highest oxidation potential, and light weight and easy for extension. It not only provides an increased open circuit voltage (Voc), but also elevated unit mass charge capacity. When aqueous solution is used as the electrolyte, the negative electrode material should be a metal with a lower oxidation potential (such as Zn, Al). This makes the open circuit voltage (1.0 V) and the energy density (100 Whr/kg) lower than those of the non-aqueous battery. Therefore, organic secondary batteries with non-aqueous electrolyte are of more practical value. The electrolyte can also be a solid. it is composed of polyethylene oxide (PEO) or its copolymer with salt. It provides the advantages of higher stability at high voltage and reduced demand in electrolyte quantity. However, it is of practical use only at temperatures above 60° C. (M. Duval et al. (Hydro-Quebec), Makromol. Chem., Makromol. Symp., 24 (1989) 151).

The synthesis methods of polyaniline include the chemical method [J. Langer, Solid State Commun., 26 (1978) 839; M. Jozfowicz, J. Polymer Sci., C22 (1969) 1187; J. P. Travers et al. Mol. Cryst. Liq. Cryst., 121(1985)195) and the electrochemical method (D. M. Mohilner et al., J. Am. Chem. Soc., 84 (1962) 3618; E. M. Genies et al., Mol. Cryst. Liq. Cryst., 121 (1985) 181]. The doped polyaniline powder made by the chemical method can not be dissolved in common organic solvents, which limits its practical applications. In 1987, A. G. MacDiarmid et al [Synth. Met., 21 (1987) 181] first found that de-doped polyaniline powder can be dissolved in NMP (1-methyl-2-pyrrolidinone) and then can be cast into film. NMP is the only known organic solvent that can completely dissolve polyaniline. In 1991 R. L. Elsenbaumer(U.S. Pat. No. 5,006,278) proposed that the polyaniline powder can be dispersed in nitromethane in the presence of ferric chloride, in which the polyaniline is simultaneously doped and dissolved. In 1990, Bridgestone Co. (U.S. Pat. No. 5,066,556 (1991); U.S. Pat. No. 4,957,833 (1990)) used the polyanilino deposited on a current collector, which was synthesized electrochemically, together with lithium (or lithium alloy) as counter electrode to compose of a button battery having a discharge capacity of 80 Ahr/kg. The drawback of this method is that to produce an organic secondary battery with a large electrode area is difficult. Recently Ricoh Co. [U.S. Pat. No. 4,999,263 (1991); U.S. Pat. No. 4,948,685 (1990)] has used the electrochemical method to synthesize a polyaniline film of 0.05 mm thick on a porous metallic film as working electrode and to produce a film battery with outside dimensions of 50 mm long, 50 mm wide and 0.9 mm thick. The battery has an energy density of 326 Whr/kg. However, the polyaniline film is brittle and can not be wound. So far, the known methods to produce a polyaniline electrode in a polyaniline secondary electrode include the following:

(1) Using the chemical method to synthesize polyaniline, mixing the doped polyaniline powder with carbon black and binder and casting the resulting mixture into a film, and pressing the film to adhere on a metallic grid. The metallic grid here is used as a current collector (A. G. MacDiarmid et al., Synthetic Metals, 18(1987)393; E. M. Genies et al., J. Applied Electrochemistry, 18 (1988) 751; M. Mizumoto et al., Synthetic Metals, 28(1989)C639).

(2) Using the electrochemical method to synthesize polyaniline film on a metal substrate. The metal substrate here also serves as a current collector. The polyaniline film synthesized by the electrochemical method has a porous fibrilar structure similar to polyacetylene, and has a large specific area. The film has a large contact area with the electrolyte solution, allowing a high diffusion rate of the charge carriers into the film so as to increase the mass charge capacity of the produced battery (F. Goto et al., J. Power Sources, 20 (1987)243; S. Tangnshi et al., J. Power Sources, 20(1987) 249; E. M. Genies et al., Synthetic metals, 29(1989)C647; Susumu Yonezawa et al., J. Electrochem. Soc., 140(1993) 629; Bridgestone Corp. U.S. Pat. No. 5,066,556 (1991); U.S. Pat. No. 4,906,538 (1990); U.S. Pat. No. 4,939,050 (1990); Ricoh Corp. U.S. Pat. No. 4,999,263 (1991); U.S. Pat. No. 4,948,685 (1990)).

There are many drawbacks in the two methods for producing polyaniline electrodes as described below:
(1) Using polyaniline synthesized by the chemical method to produce the electrode:

1. The polyaniline synthesized by the chemical method is in powder form and requires pressing to form a film. The polyaniline electrode so produced has a weak mechanical strength and is easy to crack under stress.
2. Since the polyaniline powders are adhered together through the use of polymeric binder and then pressed with the current collector to give a working electrode, the contacts among the polyaniline powders and between the polyaniline and current collector are poor. Thus, the internal resistance of the electrode is increased and the battery performance is decreased.
3. The polyaniline synthesized by the chemical method has a surface morphology more compact than that synthesized by the electrochemical method. The contact area of the electrode with the electrolyte solution is therefore smaller. During the process of charging and discharging, the ion diffusion resistance is greater; therefore, the battery performance is lower.
4. The method can not produce an electrode of large area; therefore, its practical value is limited.

(2) Using polyaniline synthesized by the electrochemical method to produce the electrode plate.

1. The polyaniline synthesized by the electrochemical method is difficult to be used for preparing a battery electrode with large area. Therefore, currently there is only button type battery available in the market [Bridgestone Corp. U.S. Pat. No. 4,957,833 (1990)].
2. The process for producing polyaniline by the electrochemical method is more complicated than that of the chemical method.
3. The polyaniline film produced by the electrochemical method is brittle and is easy to be broken by external force. Therefore, to prepare a wound-type battery is impossible.

The main objective of this invention is to provide electroconductive polymer composites for use in secondary batteries as positive electrode active materials. The composites have characteristics including excellent mechanical properties, conductivity, and large specific contact area between the electroconductive polymer and the electrolyte.

Another objective of this invention is to provide a positive electrode for a secondary battery without the drawbacks specified above.

Still another objective of this invention is to provide a non-aqueous secondary battery which has high open-circuit-voltage (Voc), high energy density, high charge capacity, and good stability of charge capacity.

SUMMARY OF THE INVENTION

In order to achieve the above objectives, an electroconductive polymer composite is prepared according to the invention which comprises: 10–99 weight percent of a conjugated electroconductive polymer and 90–1 weight percent of ionized polymeric electrolyte. The later comprises 10–90 weight percent of an ionic salt and 90–10 weight percent of a polymeric material (hereinafter referred to as the ionizable polymer), which can form an electrolyte material with the ionic salt.

Preferably, the content (weight) of the conjugated electroconductive polymer in the electroconductive polymer composite is 1–5 times that of the ionizable polymer. And the content (weight) of the ionic salt is lower than the content of the ionizable polymer.

In the electroconductive polymer composite of this invention, the ionic salt and the ionizable polymer form an ionized polymeric electrolyte. And since the ionizable polymer and the conjugated electroconductive polymer are immiscible to each other, the so formed ionized polymeric electrolyte is dispersed in the conjugated electroconductive polymer having particle diameters of about 1 to 3 micrometer. Therefore, the conjugated electroconductive polymer and the ionized polymeric electrolyte have a large contact area. Alternatively, the ionizable polymer can also present as a block of the block copolymer with the conjugated electroconductive polymer. In the electroconductive polymer composite of this invention, the conjugated electroconductive polymer can store energy and the ionizable polymer provides ductility and also serves as a reservoir for the ionic salt (or electrolyte). Therefore, when the electroconductive polymer composites of this invention are used in secondary batteries as positive electrode, the electroconductive polymer and the electrolytes of the secondary batteries have a large specific contact area. Therefore, the ion flow rate is greatly increased during the process of battery charging and discharging. Furthermore, the ductility provided by the ionizable polymer enables the electroconductive polymer composites of this invention to be processed into a large area flexible film.

DETAIL DESCRIPTION OF THE INVENTION

Figure 1:
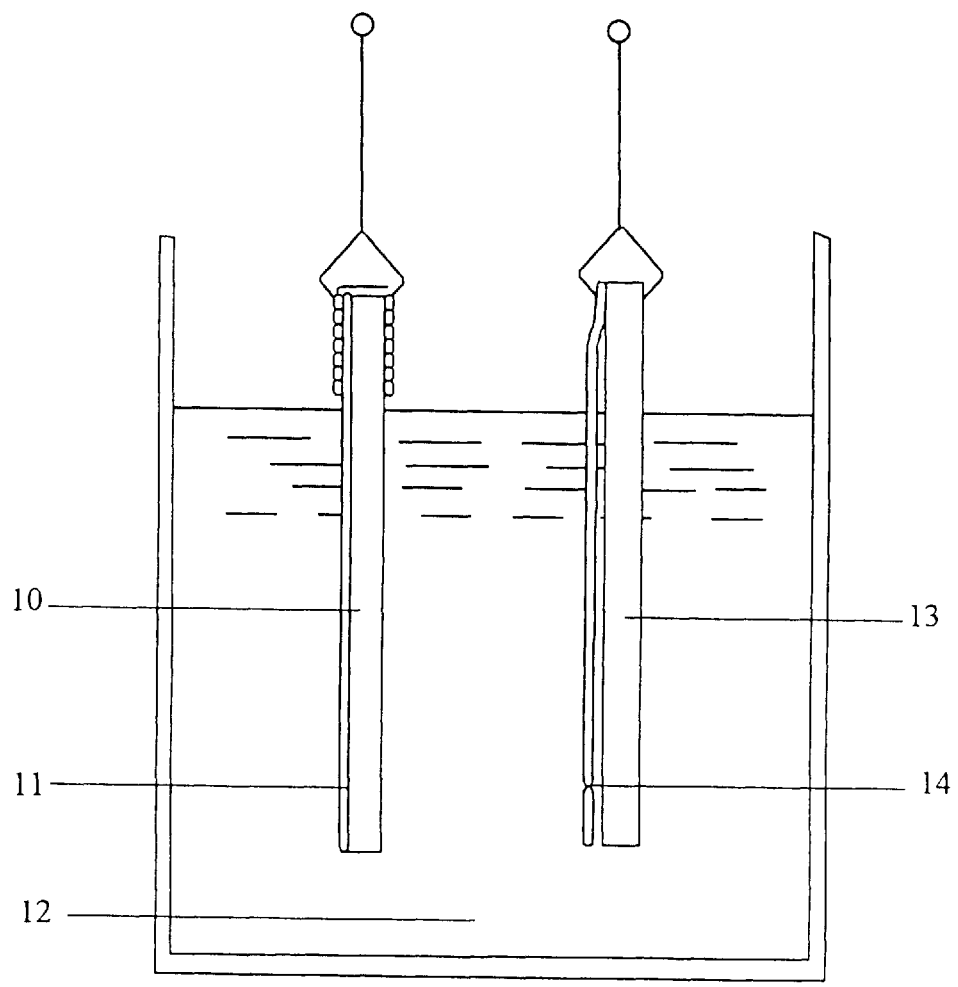
FIG. 1 is a schematic drawing of an organic secondary battery structure, in which 10 is a polyaniline film, 11 is a current collector, 12 is a non-aqueous electrolyte, 13 is lithium and 14 is a separator.

This invention provides an electroconductive polymer composite for use in secondary batteries as a positive electrode active material which comprises: 10–99 weight percent of a conjugated electroconductive polymer and 90–1 weight percent of ionized polymeric electrolyte. The later comprises 10–90 weight percent of an ionic salt and 90–10 weight percent of a polymer (referred to as the ionizable polymer) which can form an electrolyte material with the ionic salt. Preferably, the content of the conjugated electroconductive polymer is 1–5 times that of the ionizable polymer. And the content of the ionic salt is lower than the content of the ionizable polymer.

Suitable conjugated electroconductive polymers include polyanilines (PAn's), polypyrroles (PPy's) and polythiophenes (PT's), among which, polyaniline is preferred. A typical example of the polyanilines is polyaniline. It can also be a copolymer formed by aniline and one or more of the following three monomers:

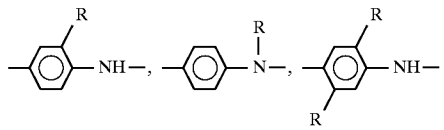

in which R is $-OC_nH_{2n+1}$, $-C_nH_{2n+1}$ or $-C_6H_5$, n is an integer of 1 to 12. Other suitable polyanilines are known in the industry, for example the ones disclosed in U.S. Pat. No. 4,983,322. The disclosure of this patent is incorporated herein for reference.

The conjugated electroconductive polymer of this invention requires a molecular weight, in principle, high enough to form a film. Generally speaking, the number average molecular weight should be larger than 1000.

Appropriate methods used in preparing the polyanilines include the chemical synthesis method and the electrochemical synthesis method. Steps of the former method include adding dropwisely 1M hydrochloric acid solution of ammonium persulfate $[(NH_4)_2S_2O_8]$ into a hydrochloric acid solution of aniline to proceed the oxidation polymerization. Several hours after the oxidation polymerization, HCl-doped polyaniline powders with blue green color can be obtained. Using 1M ammonium water ($NH_4OH$) to proceed de-doping, washing with water, and then drying, a de-doped polyaniline powder can be obtained. The electrochemical method for synthesis of polyaniline involves inserting a pair of electrodes in aniline acid solution and then applying an electric potential to proceed electrochemical oxidation polymerization of aniline on the platinum anode.

The ionic salts suitable for use in this invention include (but are not limited to) metal salts such as $LiClO_4$, $LiBF_4$, $LiPF_6$, $LiSbF_6$, LiBr, LiCl, LiI, $LiAlCl_4$, LiSCN, $NaPF_6$, $NaSbF_6$, $NaAsF_6$, $NaClO_4$, NaI, NaCl, $KClO_4$ and $Zn(ClO_4)_2$.

The ionizable polymers suitable for this invention include (but are not limited to) polyvinyl alcohol and polyalkylene oxide and their copolymers. Their number average molecular weight is larger than 1000. Preferably, the ionizable polymer is polyvinyl alcohol, polyethylene oxide, polypropylene oxide, polybutylene oxide or copolymer of ethylene oxide/propylene oxide.

An appropriate method of preparing the electroconductive polymer composite comprises the steps of dissolving a desired ratio of the conjugated electroconductive polymer, the ionic salt and the ionizable polymer in a common organic solvent and mixing the solution to form a homogeneous mixture, and then drying and removing the solvent in the mixture. Preferably, the mixture is cast on a flat substrate to form a coated layer and the solvent in the coated layer is removed to obtain an electroconductive polymer composite film. The common organic solvent can be, for example, 1-methyl-2-pyrrolidinone (NMP).

In the electroconductive polymer composite of this invention, the ionic salt and the ionizable polymer form a polymeric electrolyte. And since the ionizable polymer and the conjugated electroconductive polymer are immiscible to each other, the so-formed polymeric electrolyte is dispersed in the conjugated electroconductive polymer to form dispersed particles with diameter of about 1 to 3 micrometer. Therefore, the conjugated electroconductive polymer and the polymeric electrolyte have a large contact area. Alternatively, the ionizable polymer can also be present as a block of the block copolymer with the conjugated electroconductive polymer. In the electroconductive polymer composite of this invention, the conjugated electroconductive polymer can store the energy and the ionizable polymer provides ductility and also serves as a reservoir for the ionic salt (or electrolyte). Therefore, when the electroconductive polymer composites of this invention are used in secondary batteries as positive electrode, the electroconductive polymer composites and the electrolytes of the secondary batteries have a large specific contact area. Therefore, the ion flow rate is greatly increased during the process of battery charging and discharging. Furthermore, the ductility provided by the ionizable polymer enable the electroconductive polymer composites of this invention to be processed into a large area flexible film.

A method of using the electroconductive polymer to prepare the positive electrode of a secondary battery comprises the steps of dissolving the above three components in an appropriate solvent (such as 1-methyl-2-pyrrolidinone), homogeneously mixing the solution, casting the mixture on an appropriate metallic grid or plate (such as nickel, aluminum or platinum) and removing the solvent in the mixture to form a film which adheres to the metal grid or plate. The film herein is the positive electrode active material and the metallic grid or plate is the current collector. Alternatively, the metallic grid or plate can be replaced by a metallic thin film (such as nickel, aluminum or platinum) deposited on the surface of the film by use of thermal evaporation or sputtering.

A non-aqueous organic secondary battery can be made by using the above positive electrode. The secondary battery is composed mainly of: the positive electrode, a negative electrode composed of a lithium, lithium alloy, Li insertion compounds or other active metals such as Zn, Al, and a non-aqueous electrolyte solution.

The solvent used in the non-aqueous electrolyte solution includes propylene carbonate (PC) or its mixture with another organic solvent such as dimethoxyethane, lactones, or ethers. The reasons for choosing PC are that it has a high dielectric constant and dipole moment, and therefore has a high salvation power, which results in a high performance of the battery. The solvent was dried prior to use by removing the minor content of water through the use of molecular sieve followed with distillation twice. The dissolved electrolytes are selected from the metallic salts such as $LiClO_4$, $LiBF_4$, $LiPF_6$, $LiSbF_6$, LiI, LiBr, LiCl, $LiAlCl_4$, LiSCN, $NaPF_6$, $NaSbF_6$, $NaAsF_6$, $NaClO_4$, NaI, NaCl, $KClO_4$, $Zn(ClO_4)_2$, among which the commonly used electrolytes are $LiClO_4$, $LiBF_4$, $LiPF_6$ and $LiAsF_6$. The concentration of electrolyte is usually 0.2–3M. In the examples of this invention, the concentration is selected as 1.0M $LiClO_4$-PC solution.

In order to avoid short circuits due to the contact of positive and negative electrodes, a separator is added between the two electrodes in the battery. The separator needs to have insulation capability and porosity so as to allow the passage of ions. The separator materials commonly used are synthetic resins such as polypropylene, polyethylene and fibrilar material.

The non-aqueous electrolyte solution in the non-aqueous organic secondary battery can be substituted by a solid polymeric electrolyte to give an organic secondary battery containing a solid polymeric electrolyte. The solid polymeric electrolyte is an ionic electroconductive polymer such as polyalkylene oxide or polyvinyl alcohol with dissolved ionic salts therein.

The specific contact area between the electrolyte and the electroconductive macromolecule electrode has a great influence on battery performance. A battery electrode with a high specific contact area can have increased powder density, charge capacity and energy density and reduced charging time. Although the polyaniline film or its composite film has good mechanical properties, the film surface is quite compact due to the plasticization by NMP. Therefore, the contact area of the film and the electrolyte solution is low. However, the composite film containing salt can improve this drawback because the PVA in the composite film contains dissolved salts. Therefore, the blending results in an increase in the specific contact area between the PAn and electrolyte. As a result, the battery performance is increased. In order to explain the merits of this invention, comparisons of the examples in this invention and methods disclosed in the literature are given below. In the examples, mA is milliampere, V is volt, hr is hour, kg is kilogram, and W is watt.

EXAMPLE 1

Figure 2:
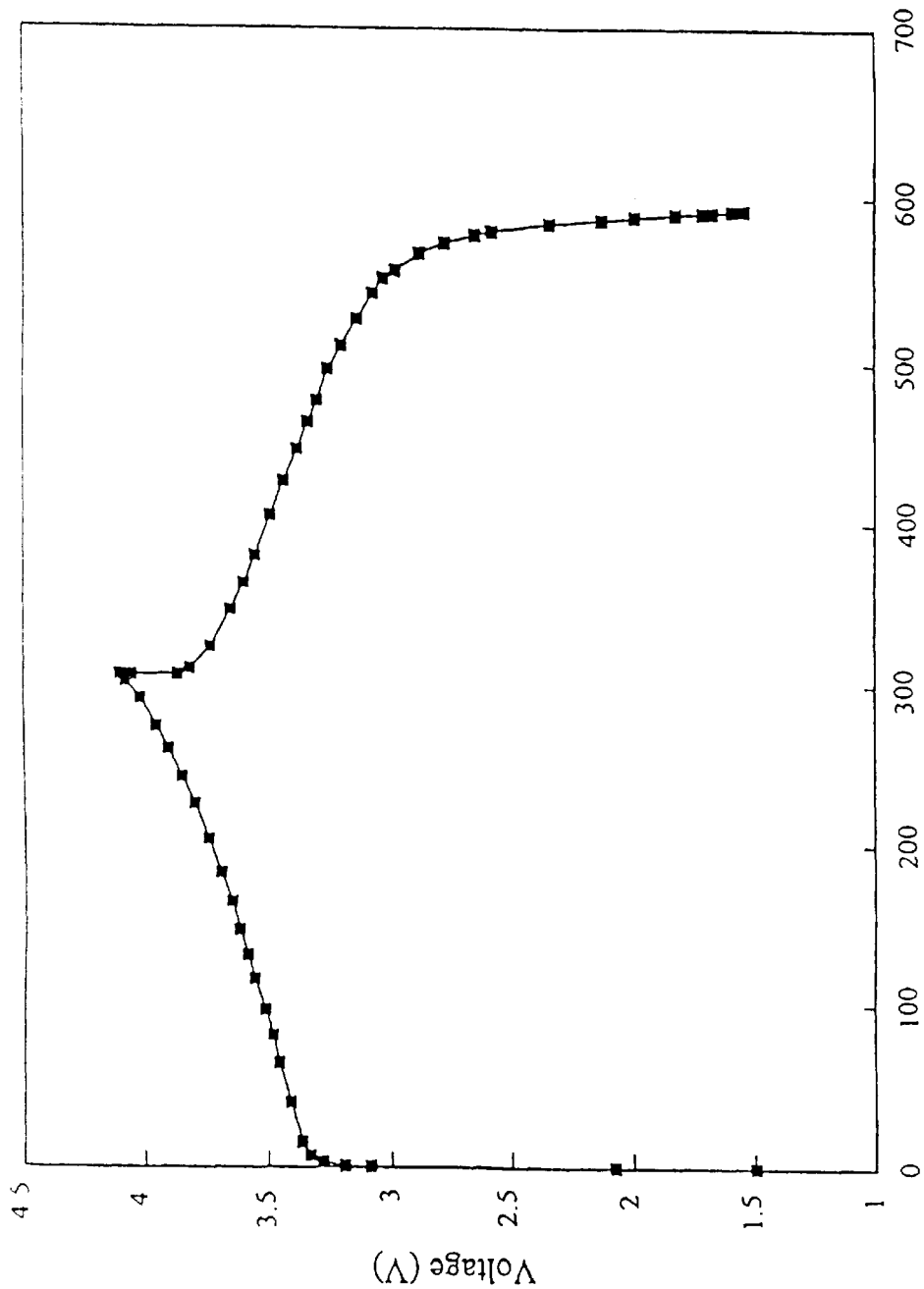
FIG. 2 is a diagram showing the potential of tenth charge/discharge cycle vs. charge/discharge time of a Li | 1.0M $LiClO_4$-PC | $PAn/PVA/LiClO_4$ battery.

200 ml of 1M HCl water solution, which contained 0.15 mole of ammonium persulfate ($(NH_4)_2S_2O_8$, Merck, GR), was prepared. The solution so prepared was added drop-wisely into a 200 ml 1M HCl water solution which contained 0.1 mole of aniline (Merck, GR). The reaction then took place under an ice bath for several hours. Green precipitates were obtained. The green precipitates are polyaniline at the doped state. The doped polyaniline was then dispersed in 1.5M ammonium hydroxide aqueous solution to undergo de-doping. The de-doped polyaniline powders were washed with a large quantity of deionized water until the filtrate was neutral and subsequently were dried under vacuum below 1 torr for 48 hours. The undoped polyaniline powder and polyvinyl alcohol (PVA, Chang-Chun Petrochemical Co., Code: BP-17) powder (with average molecular weight of $7.5 \times 10^4$), and lithium perchlorate ($LiClO_4$, Fluka, AG) at weight ratio of 1:1:0.6 were dissolved in NMP (Janssen, GC). The mixture was poured on a nickel grid and subjected to dynamic vacuum pumping below 1 torr at 50° C., in order to remove the solvent (NMP); a PAn/PVA/$LiClO_4$ composite film inserted with nickel grid was obtained. A PAn/PVA/$LiClO_4$ composite film of 38 mg with a single face surface area of 3 $cm^2$, thickness of 0.1 mm was used as the positive electrode of an organic secondary battery. The nickel grid inserted in the film was used as the current collector. Lithium metal was used as the negative electrode. 20 ml of 1.0M $LiClO_4$-PC was used as electrolyte solution. The structure of the assembled organic secondary battery is shown in FIG. 1. The open circuit voltage (Voc) of the battery measured before charging/discharging was 3.04 V, and the short circuit current (Isc) was 1.8 mA. The battery was then subjected to constant current (0.2 mA) charge/discharge cycles. The upper limit of the potential difference between the two electrodes during the charging was 4.1 V. The lower limit of the potential difference between the two electrodes during the discharging was 1.5 V. The potential curve of the tenth charge/discharge cycle is shown in FIG. 2. From the variation of the potential vs. discharge time in FIG. 2, one can see that the time required for the potential to drop from 3.7 V to 3.0 V was about 270 minutes which is quite close to the charge time of 300 minutes. This indicates that the battery has a stable potential during use. After the tenth cycle, the open circuit voltage was 3.70 V and the short circuit current was 27.8 mA. The energy density based on the weight of the composite film was 85 Whr/kg and based on the weight of polyaniline was 221 Whr/kg. The average Coulomb efficiency of the battery was 91%.

EXAMPLE 2

Dissolved the undoped polyaniline as in example 1 and polyvinyl alcohol (PVA) in NMP at 1:1 weight ratio to give a homogeneous solution. The solution was then cast into film with an insertion of a nickel grid in accordance with the procedures described in example 1. Please note that the film does not contain electrolyte. A PAn/PVA composite film of 24.2 mg with a single face surface area of 2.8 $cm^2$, thickness of 0.07 mm was used as the positive electrode. The negative electrode and the electrolyte solution were the same as in example 1. The nickel grid inserted in the film was used as the current collector. Before charge/discharge, the open circuit voltage of the battery was 2.75 V. As in example 1, the battery was also subjected to constant current (0.2 mA) charge/discharge cycles. The upper limit of charge was 4.1 V, and the lower limit of discharge was 1.5 V. The open circuit voltage after 60 cycles of charge/discharge was 3.70 V and the short circuit current (Isc) was 2.1 mA. The energy density based on weight of the PAn/PVA composite film was 26 Whr/kg and based on the weight of polyaniline was 52 Whr/kg. The average Coulomb efficiency of the battery was 97%.

EXAMPLE 3

Dissolved undoped polyaniline powder as in example 1 in NMP to give a homogenous solution. The solution was then cast into film with an insertion of a nickel grid in accordance with the procedures described in example 1. Please note that the film does not contain electrolyte. A PAn film of 26 mg with a single face surface area of 2.8 $cm^2$, thickness of about 0.07 mm was used as the positive electrode. The nickel grid was used as the current collector. The negative electrode and the electrolyte solution were the same as in example 1. Before charge/discharge, the open circuit voltage of the battery was 2.90 V and the short circuit current was 0.7 mA. As in example 1, 0.2 mA constant current was used to proceed the charge/discharge cycles. The upper limit of charge was 4.1 V and the lower limit of discharge was 1.5 V. The open circuit voltage after 30 cycles of charge/discharge was 3.73 V and the short circuit current (Isc) was 5.9 mA. The energy density was 65 Whr/kg. The average Coulomb efficiency of the battery was 89%.

Table 1 lists the performances of the above three examples after ten cycles of charge/discharge. From the table, one can learn that when PAn/PVA/$LiClO_4$ composite film was used as the positive electrode, the battery has the highest energy density and charge capacity. This is due to that the contact area between the PAn and the electrolyte is very large as can be seen from the higher short circuit current. From the experimental data of charge/discharge, the energy densities of the above examples can be calculated, being 85 Whr/kg, 26 Whr/kg, 65 Whr/kg, respectively. The energy densities corresponding to the weight of the polyaniline are 221

Figure 3:
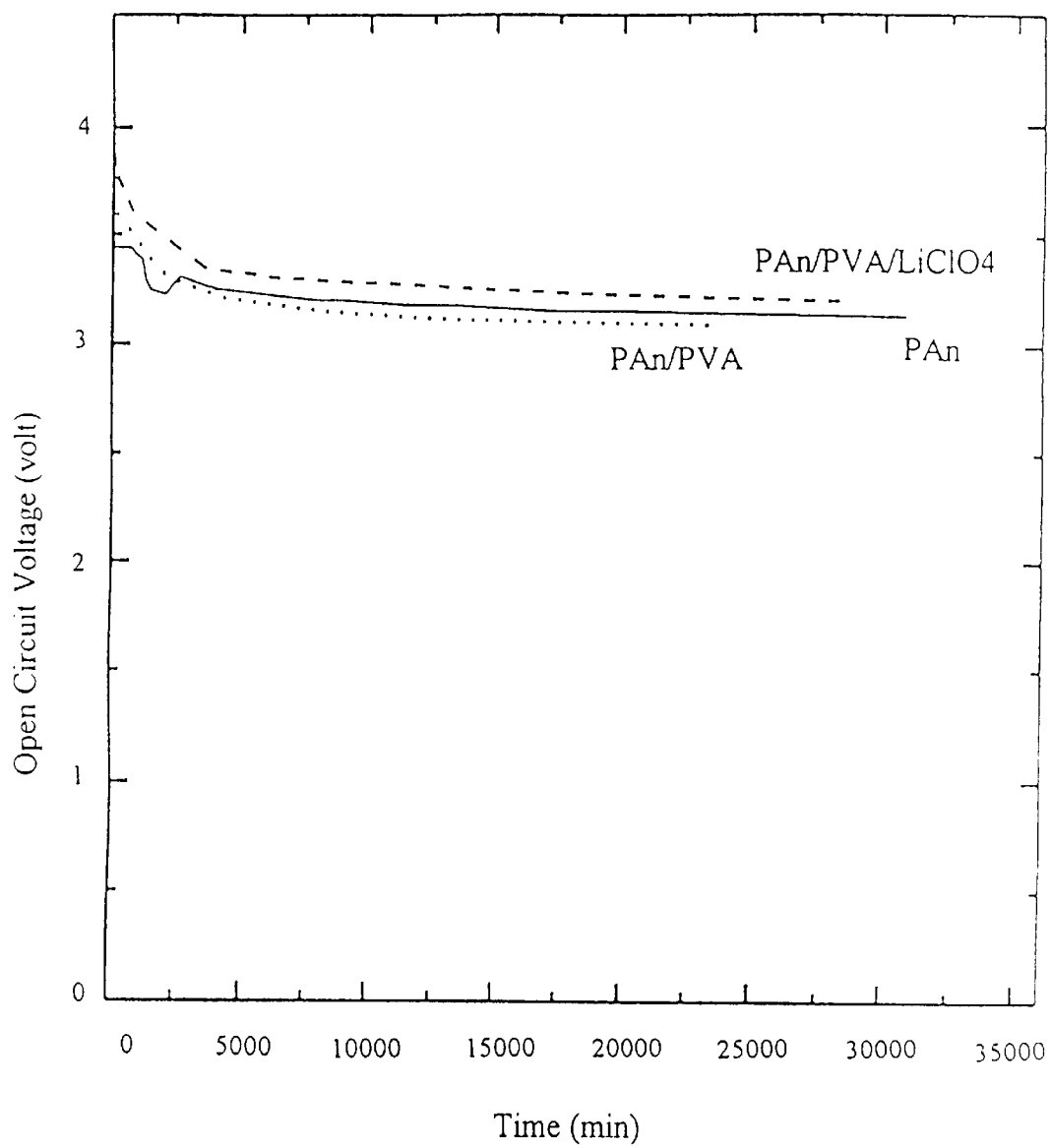
FIG. 3 is a diagram showing open circuit potential (Voc) vs. time of three different batteries, in which the positive electrode active materials of the three different batteries respectively are $PAn/PVA/LiClO_4$( - - - ), PAn/PVA( . . . ), and PAn(—).

Whr/kg, 52 Whr/kg, and 65 Whr/kg, respectively, among which the PAn/PVA/LiClO$_4$ composite film has the highest value. In comparison with lead acid battery, the energy density of composite film battery is about six times higher. The decay of open circuit voltages of the three batteries vs. time are shown in FIG. 3. As can be seen, the three batteries have similar stability.

The charge capacities and energy densities of the above three examples are relatively low. This is because the polyaniline film used as the positive electrode is too thick or the surface area of the current collector is too small. This causes that only the locations close to the current collector have charge/discharge reaction and the rest of the polyaniline remain inert. Therefore, the overall charge capacity and energy density are decreased. In order to improve this drawback, the inventors have used a platinum foil as the current collector to replace the nickel grid and reduced the composite film thickness. Their charge/discharge characteristics are explained in the following four examples.

EXAMPLE 5

Figure 4:
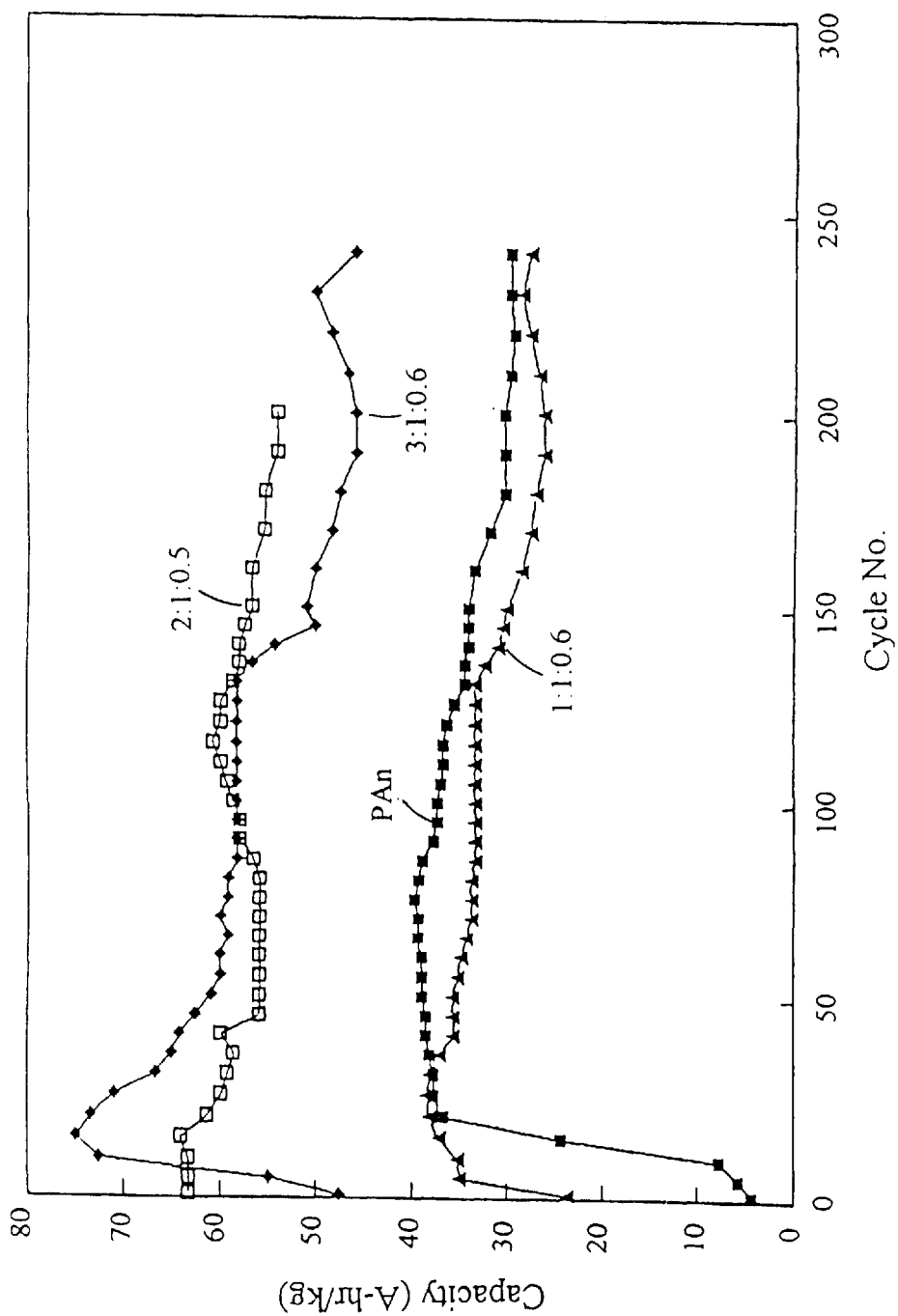
FIG. 4 is a diagram showing the discharge capacity vs. charge/discharge cycles of four different batteries, in which the positive electrode active materials of the four different batteries respectively are PAn(—■—) and $PAn/PVA/LiClO_4$ of weight ratios of 3:1:0.6(—♦—) 1:1:0.6(—▲—), and 2:1:0.5(—□—).

The weight ratio of PAn/PVA/LiClO$_4$ composite film in example 4 was changed to 2:1:0.5. The composite film of 0.5 mg having a single face surface area of 2.6 cm$^2$ and thickness of about 0.002 mm was used as the positive electrode. The other experiment conditions were the same as in example 4. The open circuit voltage after 200 cycles of charge/discharge was 3.80 V and the short circuit current (Isc) was 28 mA. The energy density based on the weight of the PAn/PVA/LiClO$_4$ composite film was 208 Whr/kg and based on the weight of polyaniline was 364 Whr/kg. The variation of charge capacity with cycle number in FIG. 4 shows that the battery has a stable charge capacity.

EXAMPLE 6

The weight ratio of PAn/PVA/LiClO$_4$ composite film in example 4 was changed to 3:1:0.6. The composite film of 0.4 mg having a single face surface area of 2.6 cm$^2$ and thickness of about 0.0015 mm was used as the positive

TABLE 1

Battery Performances of Examples 1, 2, 3 (After Tenth Charge/Discharge Cycles)

| Battery NO | Positive Electrode | Negative Electrode | Electrolyte solution | Open Circuit Voltage (V) | Short Circuit Current (mA) | Energy Density (Whr/kg) | Energy Density (Whr/kg) @ | Capacity (Ahr/kg) |
|---|---|---|---|---|---|---|---|---|
| 1 | PAn/PVA/ LiClO$_4$ on Ni 3.0 cm$^2$ 38 mg | Li | 1.0M LiClO$_4$-PC | 3.70 | 27.8 | 85 | 221 | 25 |
| 2 | PAn/PVA on Ni 2.8 cm$^2$ 24.2 mg | Li | 1.0M LiClO$_4$-PC | 3.70 | 2.1 | 26 | 52 | 8 |
| 3 | PAn on Ni 2.8 cm$^2$ 26 mg | Li | 1.0M LiClO$_4$-PC | 3.73 | 5.9 | 65 | 65 | 20 |
| # | PbO$_2$ | Pb | H$_2$SO$_4$ aq— | 2.0 | — | 30–40 | — | — |

@ Based on weight of polyaniline.
Lead-acid battery

EXAMPLE 4

According to the procedures of preparation in example 1, a solution of PAn/PVA/LiClO$_4$ at weight ratio of 1:1:0.6 in NMP was prepared. The solution was then cast on metallic foil (such as platinum, stainless steel foil, aluminum foil) and subjected to dynamic vacuum pumping below 1 torr at 50° C., and a PAn/PVA/LiClO$_4$ composite film was obtained. The composite film of 1.0 mg with a single face surface area of 3.0 cm$^2$ and thickness of about 0.003 mm was used as the positive electrode. The metallic foil was used as the current collector. The negative electrode and the electrolyte solution were the same as in example 1. As in example 1, 0.2 mA current was used to proceed the constant current charge/discharge cycles. The upper limit of charge was 4.1 V and the lower limit of discharge was 2.0 V. The open circuit voltage after 240 cycles of charge/discharge was 3.80 V and the short circuit current (Isc) was 28 mA. The energy density based on the weight of the PAn/PVA/LiClO$_4$ composite film was 125 Whr/kg and that based on the weight of polyaniline was 325 Whr/kg. The variation of charge capacity with cycle number in FIG. 4 shows that the battery has a stable charge capacity.

electrode. The other experiment conditions were the same as in example 4. The open circuit voltage after 240 cycles of charge/discharge was 3.75 V and the short circuit current (Isc) was 28 mA. The energy density based on the weight of the PAn/PVA/LiClO$_4$ composite film was 263 Whr/kg and based on the weight of the polyaniline was 374 Whr/kg. The variation of charge capacity with cycle number shown in FIG. 4 shows that the battery has a stable charge capacity.

EXAMPLE 7

The PAn solution of example 3 was cast on a metallic foil (such as platinum, stainless steel foil, aluminum foil), and then subjected to dynamic vacuum pumping below 1 torr at 50° C. to obtain a PAn film. The film of 0.9 mg with a single face surface area of 2.2 cm$^2$ and thickness of about 0.002 mm was used as the positive electrode. The other experiment conditions were the same as in example 4. The open circuit voltage after 240 cycles of charge/discharge was 3.78 V and the short circuit current (Isc) was 25 mA. The energy density was 110 Whr/kg. The variation of charge capacity with cycle number FIG. 4 shows that the battery has a stable charge capacity.

EXAMPLE 8

After the battery in example 5 has been set aside for four months, the open circuit voltage was 3.2 V. After charge/discharge experiments, the energy density of the battery based on the weight of the PAn/PVA/LiClO$_4$ composite film was 163 Whr/kg and based on the weight of polyaniline was 289 Whr/kg. In comparison with example 5, the open circuit voltage and energy density of the battery has decreased by only 15% and 21% respectively. The reason for such decay is that the lithium reacted with a tiny amount of water in the system (this can be observed from that the lithium surface has turned to black), causing the decreased performance of the battery. This problem can be avoided by removing the water completely and by prevention from the leakage of air into the battery.

Figure 5A:
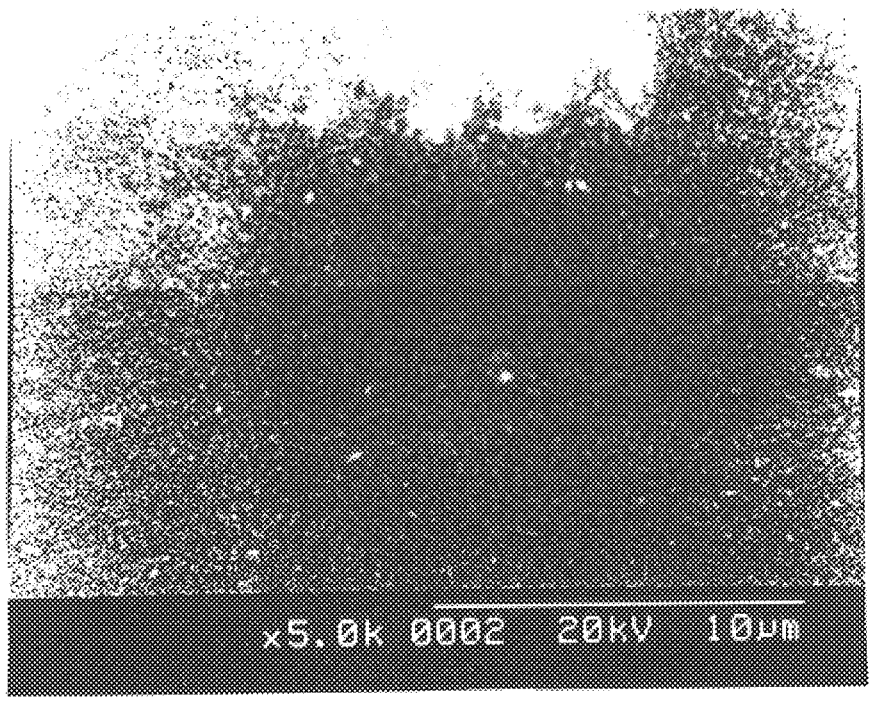
FIGS. 5(a) and (b) are diagrams showing (a) SEM micrograph (magnification by 5000 times) of the PAn film cast from the NMP solution of PAn synthesized by the chemical method and (b) SEM micrograph (magnification by 5000 times) of $PAn/PVA/LiClO_4$ composite film with the weight ratio 2:1:0.6.
Figure 5B:
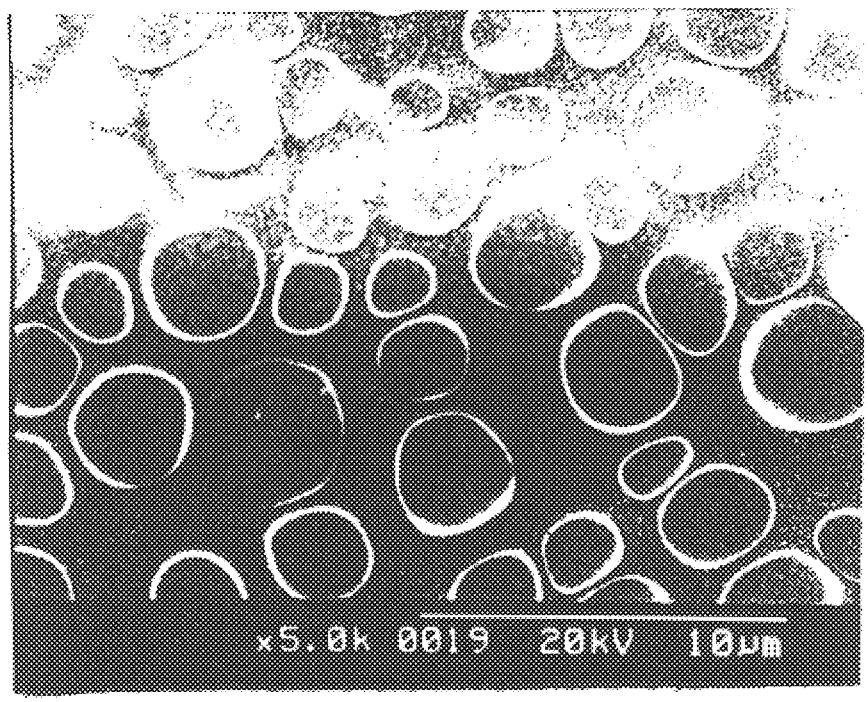
Figure 6:
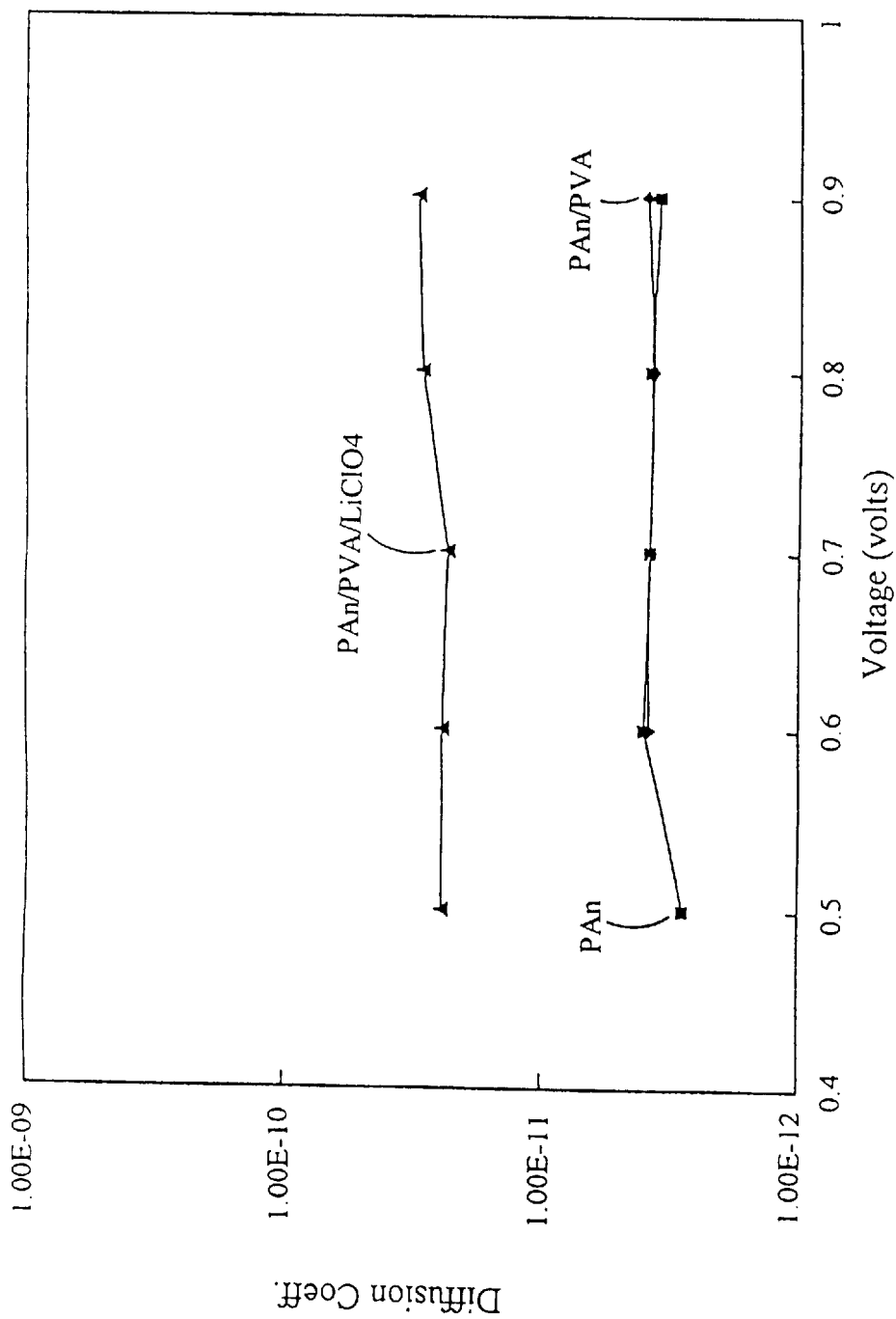
FIG. 6 is a diagram showing the diffusion coefficient vs. potential during the oxidation (or charging) process of three different types of film, in which the electrolyte solutions are all 0.3M $LiClO_4$-PC solution and the films as the positive electrodes are respectively PAn(—■—), PAn/PVA(—♦—) and $PAn/PVA/LiClO_4$(—▲—).

The performances of the batteries in examples 4 to 7 after 15 cycles of charge/discharge are listed in Table 2. As can be seen, when a PAn/PVA/LiClO$_4$ composite film was used as the positive electrode, the energy density, open circuit voltage and short circuit current were higher than those of the battery with PAn film. FIG. 5 shows the morphologies of the PAn film cast from PAn solution in NMP, and the PAn/PVA/LiClO$_4$ composite film with a weight ratio of 2:1:0.6. AS can be seen, the surface of PAn is quite compact and featureless and that of the composite film less experienced a phase separation with the dispersed phase being a complex of PVA and salt and the continuous phase being PAn. Since the PVA phase contains the electrolyte, the specific contact area of PAn and electrolyte is very large. During charging, the anions could directly diffuse from the PVA phase into the PAn phase, which allows an improvement of the drawback due to a small specific area of PAn film. Using the spectro-electrochemical method, the diffusion coefficient of the ions in the polyaniline film and the PAn/PVA and PAn/PVA/LiClO$_4$ composite films were measured, the results are shown in FIG. 6. From FIG. 6, one can see that the composite film of PAn/PVA/LiClO$_4$ has the highest ion diffusion coefficient. That is the battery has the highest charge/discharge rate when PAn/PVA/LiClO$_4$ film was used as a positive electrode. The composition of the composite film also has great influence on the performance of the battery. The PAn/PVA/LiClO$_4$ composite film with a weight ratio of 3:1:0.6 has the highest energy density; that with a weight ratio of 2:1:0.5 is next; and that with a weight ratio of 1:1:0.6 is the smallest. Among these three composites, when the PAn content is higher, the battery has better performance. In comparison with the lead acid battery, the battery with the composite film has an energy density ten times higher.

TABLE 2

Battery Performances of Examples 4, 5, 6, 7 (After Fifteenth Charge/Discharge Cycle)

| Battery No | Positive Electrode | Open Circuit Voltage (V) | Short Circuit Current (mA) | Energy Density (Whr/kg) | Energy Density (Whr/kg) @ | Capacity |
|---|---|---|---|---|---|---|
| 4 | PAn/PVA/LiClO$_4$ (1:1:0.6) 2.5 cm$^2$ 0.7 mg | 3.80 | 28 | 125 | 325 | 39 |
| 5 | PAn/PVA/LiClO$_4$ (2:1:0.5) 2.6 cm$^2$ 0.5 mg | 3.80 | 28 | 208 | 364 | 64 |
| 6 | PAn/PVA/LiClO$_4$ (3:1:0.6) 2.1 cm$^2$ 0.4 mg | 3.80 | 28 | 263 | 374 | 80 |
| 7 | PAn 2.2 cm$^2$ 0.9 mg | 3.78 | 25 | 110 | — | 36 |

@ Based on weight of polyaniline.

EXAMPLE 9

Figure 7:
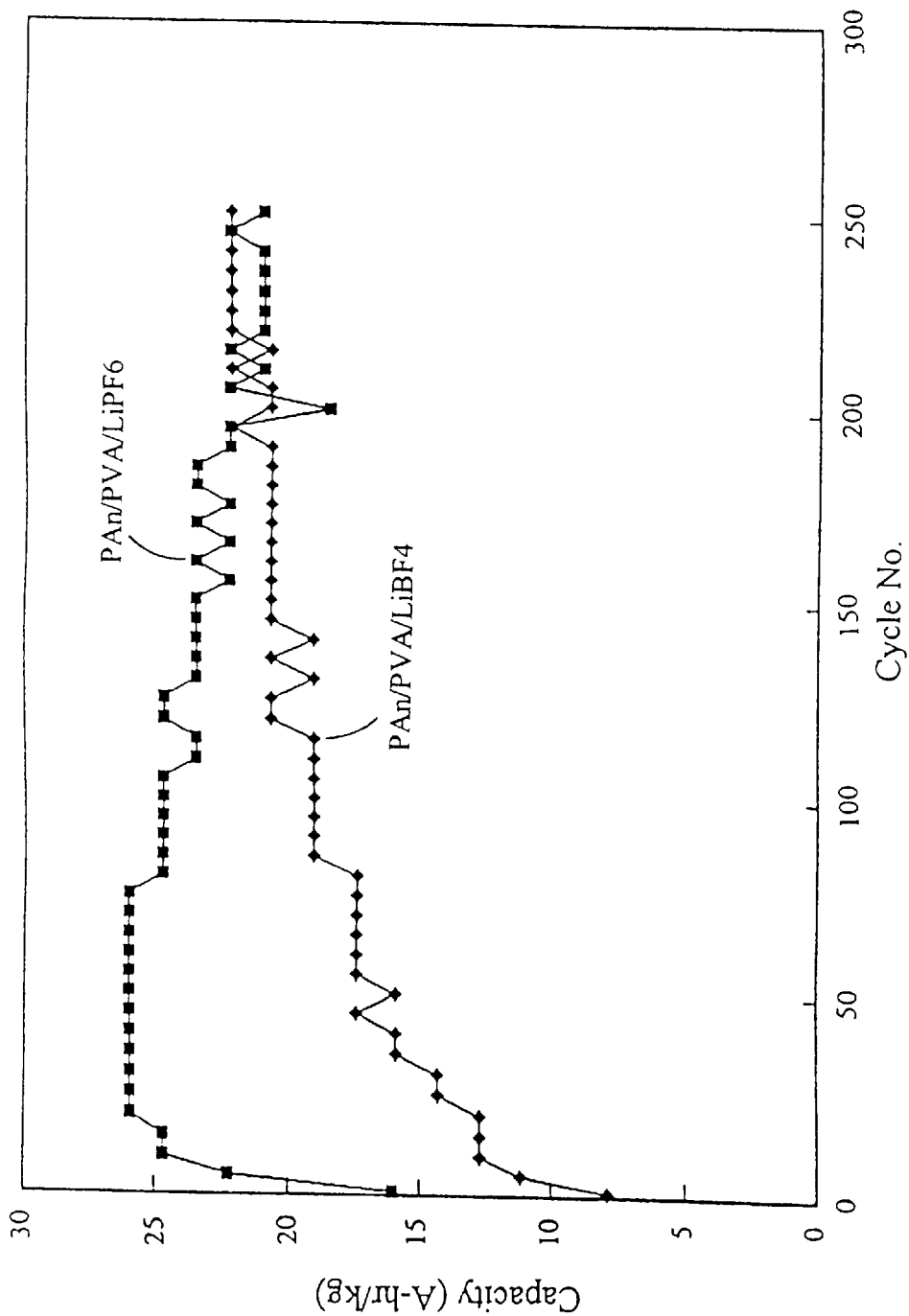
FIG. 7 is a diagram showing capacity vs. discharge/charge cycles of two batteries, in which the positive electrode are respectively $PAn/PVA/LiPF_6$(—■—) and $PAn/PVA/LiBF_4$ (—♦—).

According to the procedures of preparation in example 1, a solution of PAn/PVA/LiBF$_4$ at a weight ratio of 1:1:0.6 in NMP was prepared. The solution was cast on metallic foil (such as platinum, stainless steel foil, aluminum foil) and subjected to dynamic vacuum pumping below 1 torr at 50° C., a PAn/PVA/LiBF$_4$ composite film was obtained. The composite film of 0.35 mg with a single face surface area of 2.9 cm$^2$ was used as the positive electrode. The metallic foil was used as the current collector. The negative electrode and the electrolyte solution were the same as in example 1. As in example 1, 0.2 mA current was used to proceed the constant current charge/discharge cycles. The upper limit of charge was 4.1 V and the lower limit of discharge was 2.0 V. The open circuit voltage after 250 cycles of charge/discharge was 3.85 V and the short circuit current (Isc) was 9.5 mA. The energy density based on weight of the PAn/PVA/LiBF$_4$ composite film was 71 Whr/kg and that based on the weight of polyaniline was 185 Whr/kg. The variation of the charge capacity with the cycle number in FIG. 7 shows that the battery has a stable charge capacity.

EXAMPLE 10

According to the procedures of preparation in example 1, a solution of PAn/PVA/LiPF$_6$ at weight ratio of 1:1:0.6 in NMP was prepared. The solution was then cast on metal foil (such as platinum, stainless steel foil, aluminum foil) and subjected to dynamic vacuum pumping below 1 torr at 50° C., a PAn/PVA/LiPF$_6$ composite film was obtained. The composite film of 0.45 mg with a single side surface area of 3.12 cm$^2$ was used the positive electrode. The metallic foil was used as the current collector. The negative electrode and the electrolyte solution were the same as in example 1. As in example 1, a 0.2 mA current was used to proceed the constant current charge/discharge cycles. The upper limit of charge was 4.1 V and the lower limit of discharge was 2.0 V. The open circuit voltage after 250 cycles of charge/discharge was 3.80 V and the short circuit current (Isc) was 10 mA. The energy density based on the weight of the PAn/PVA/LiPF$_6$ composite film was 83 Whr/kg and that based on the weight of polyaniline was 216 Whr/kg. The variation of charge capacity with the cycle number in FIG. 7 shows that the battery has a stable charge capacity.

EXAMPLE 11

Figure 8:
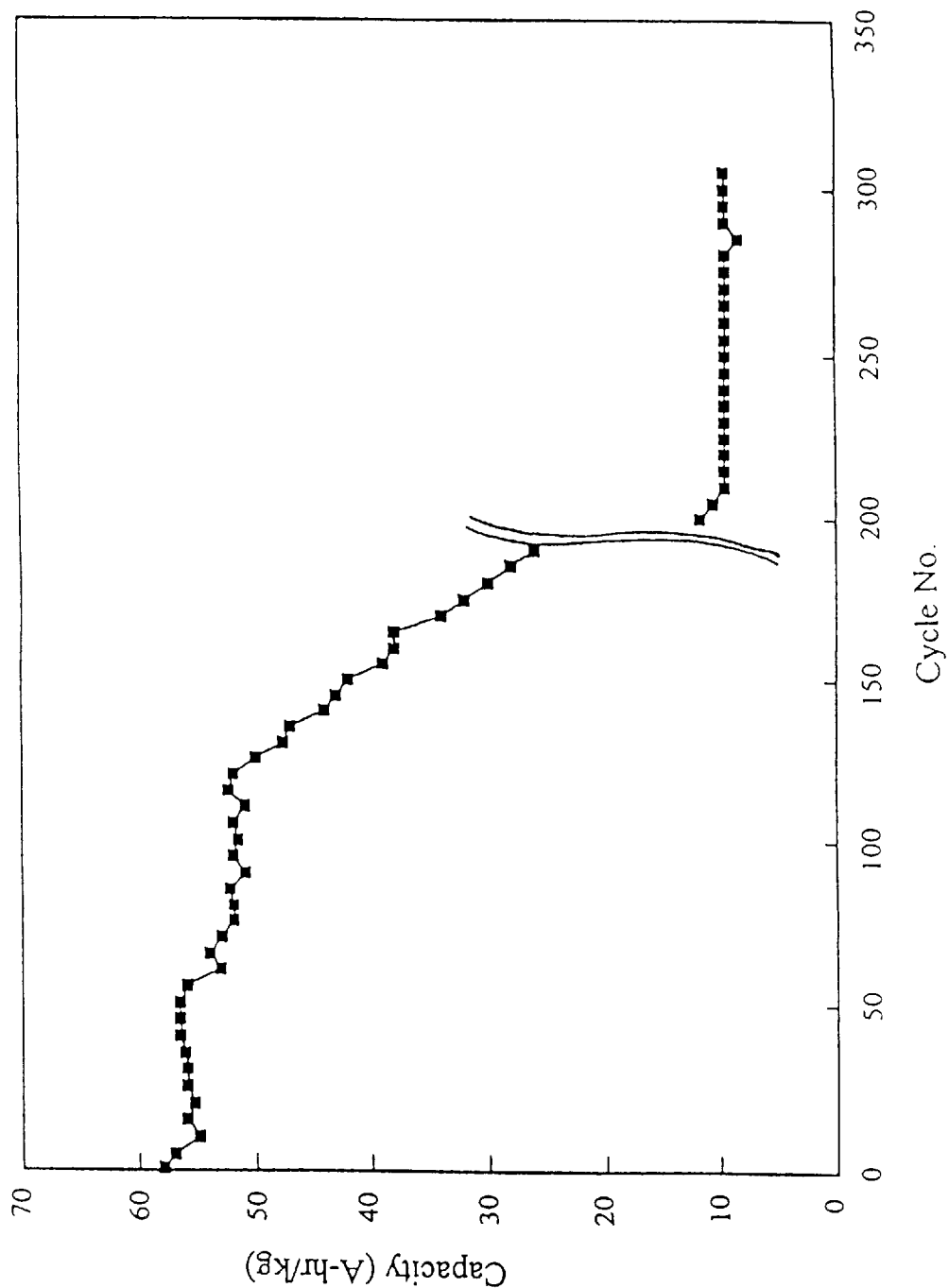
FIG. 8 is a diagram showing the capacity vs. discharge/charge cycles of a battery containing $PAn/PEO/LiClO_4$ composite film.

According to the procedures of preparation in example 1, a solution of PAn/PEO/LiClO$_4$ at a weight ratio of 1:1:0.6 in NMP was prepared. The polyethylene oxide (PEO, Polysciences, Inc.) used here had a molecular weight of 4×10$^6$. The solution was cast on metallic foil (such as platinum, stainless steel foil, aluminum foil) and subjected to dynamic vacuum pumping below torr at 50° C., a PAn/PEO/LiClO$_4$ composite film was obtained. The composite film of 0.5 mg with a single side surface area of 2.9 cm$^2$ was used as the positive electrode. The metallic foil was used as the current collector. The negative electrode and the electrolyte solution were the same as in example 1. As in example 1, 0.2 mA current was used to proceed the constant current charge/discharge cycles. The upper limit of charge was 4.1 V and the lower limit of discharge was 2.0 V. The open circuit voltage after 300 cycles of charge/discharge was 3.60 V and the short circuit current (Isc) was 15 mA. The energy density based on the weight of the PAn/PEO/LiClO$_4$ composite film was 180 Whr/kg and that based on the weight of polyaniline was 466 Whr/kg. The variation of charge capacity with cycle number in FIG. 8 shows that the battery has a less stable charge capacity than the battery with PAn/PVA/LiClO$_4$ composite film.

The performances of the batteries in examples 9 to 11 after 15 cycles of charge/discharge are listed in Table 3. As can be seen from Table 2 and Table 3, when PAn/PVA/LiClO$_4$ composite film was used as the positive electrode of the battery, the energy density and short circuit current thereof were higher than those of the battery with PAn/PVA/LiBF$_4$ and PAn/PVA/LiPF$_6$ composite films. The main reasons are that the ion radius of ClO$_4^-$ is smaller than that of PF$_6^-$, and the former has higher oxidation power than the latter. This enables ClO$_4^-$ to provide the largest doping capacity and, as a result, to enhance the overall performance of the battery.

From the experimental results above, the organic secondary battery with the polyaniline composite film of this invention as the positive electrode has higher charge capacity, energy density and power density. Furthermore, due to the flexibility of this polymeric electrode, it can be used to produce a large area flexible organic secondary battery and film battery.

TABLE 3

Battery Performances of Examples 9, 10, 11 (After Fifteenth Charge/Discharge Cycle)

| Battery No | Positive Electrode | Open Circuit Voltage (V) | Short Circuit Current (mA) | Energy Density (Whr/kg) | Energy Density (Whr/kg) @ | Capacity (Ahr/kg) |
|---|---|---|---|---|---|---|
| 9 | PAn/PVA/LiBF$_4$ (1:1:0.6) 2.9 cm$^2$ 0.35 mg | 3.85 | 9.5 | 46 | 120 | 14 |
| 10 | PAn/PVA/LiPF$_6$ (1:1:0.6) 3.1 cm$^2$ 0.45 mg | 3.80 | 10.0 | 79 | 206 | 25 |
| 11 | PAn/PEO/LiClO$_4$ (1:1:0.6) 2.1 cm$^2$ 0.5 mg | 3.60 | 15.0 | 180 | 466 | 56 |

@ Based on weight of polyaniline.

What is claimed is:

1. A method of preparing an electroconductive polymer composite, which comprises the following steps: dissolving 1–5 parts, by weight, of a conjugated electroconductive polymer, less than one but greater than zero parts, by weight, of an ionic salt, and 1 part, by weight, of an ionizable polymer in a common organic solvent; mixing the resulting solution to form a homogeneous mixture; and removing the common organic solvent from the mixture such that an electroconductive polymer composite is obtained, in which the ionizable polymer is dispersed in the conjugated electroconductive polymer with a particle diameter of 1–3 micrometers.

2. The method of claim 1 wherein the common organic solvent is 1-methyl-2-pyrrolidinone.

3. The method of claim 1 wherein the homogeneous mixture is cast on a flat substrate and is dried by removing the common organic solvent therein such that an electroconductive polymer composite film is obtained.

4. The method of claim 3 wherein the common organic solvent is 1-methyl-2-pyrrolidinone.

5. A method of preparing a positive electrode of a secondary battery, said method comprising the following steps:
  (a) dissolving 10–99 weight percent of a conjugated electroconductive polymer and 90–1 weight percent of a mixture of an ionic salt and an ionizable polymer in a common organic solvent, in which the mixture comprises 10–90 weight percent of said ionic salt and 90–10 weight percent of said ionizable polymer;
  (b) mixing the resulting solution to form a homogenous mixture;
  (c) casting the homogenous mixture on a metallic grid or plate of nickel, aluminum or platinum; and (d) removing the common organic solvent from said homogenous mixture so as to cause a film to be formed on the metallic grid or plate to form a positive electrode.

6. The method of claim 5 wherein the common organic solvent is 1-methyl-2-pyrrolidinone.

7. The method of claim 5 wherein the amount of the conjugated electroconductive polymer is 1–5 times the amount of the ionizable polymer, and the amount of the ionic salt is smaller than that of the ionizable polymer.

8. The method of claim 7 wherein the ionizable polymer is dispersed in the conjugated electroconductive polymer having the particle diameter of 1–3 micrometer.

9. The method of claim 7 wherein the ionizable polymer and the conjugated electroconductive polymer form a block copolymer.

10. The method of claim 5 wherein the conjugated electroconductive polymer is selected from the group consisting of polyanilines, polypyrroles, and polythiophenes.

11. The method of claim 10 wherein the conjugated electroconductive polymer is polyanilines.

12. The method of claim 11 wherein the polyanilines are polyaniline or a copolymer formed by aniline and one or more of the following three monomers

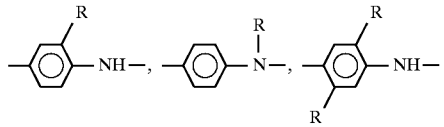

in which In which R is $-OC_nH_{2n+1}$, $-C_nH_{2n+1}$ or $-C_6H_5$, n is an integer of 1 to 12 and the polyanilines have a number average molecular weight larger than 1000.

13. The method of claim 5 wherein the ionic salt is a metallic salt selected from the group consisting of $LiClO_4$, $LiBF_4$, $LiPF_6$, $LiSbF_6$, LiBr, LiCl, LiI, $LiAlCl_4$, LiSCN, $NaPF_6$, $NaSbF_6$, $NaAsF_6$, $NaClO_4$, NaI, NaCl, $KClO_4$, and $Zn(ClO_4)_2$.

14. The method of claim 13 wherein the ionic salt is $LiClO_4$, $LiBF_4$ or $LiPF_6$.

15. The method of claim 5 wherein the ionizable polymer is polyvinyl alcohol, polyalkylene oxide or copolymers of vinyl alcohol and of alkylene oxide, and the number average molecular weight of the ionizable polymer is larger than 1000.

16. The method of claim 15 wherein the ionizable polymer is polyvinyl alcohol, polyethylene oxide, polypropylene oxide, polybutylene oxide or a copolymer of ethylene oxide/propylene oxide.

17. A method of preparing a positive electrode of a secondary battery, which comprises the following steps: dissolving 10–99 weight percent of a conjugated electroconductive polymer and 90–1 weight percent of a mixture of an ionic salt and an ionizable polymer in a common organic solvent, in which the mixture comprises 10–90 weight percent of said ionic salt and 90–10 weight percent of said ionizable polymer; mixing the resulting solution to form a homogenous mixture; casting the homogenous mixture on a flat substrate and removing the common organic solvent therefrom such that a film is formed; coating a nickel, aluminum or platinum metallic layer on one side of the film by vapor deposition or sputtering to form a positive electrode.

18. The method of claim 17 wherein the common organic solvent is 1-methyl-2-pyrrolidinone.

19. The method of claim 17 wherein the amount of the conjugated electroconductive polymer is 1–5 times the amount of the ionizable polymer, and the amount of the ionic salt is smaller than that of the ionizable polymer.

20. The method of claim 19 wherein the ionizable polymer is dispersed in the conjugated electroconductive polymer having the particle diameter of 1–3 micrometer.

* * * * *